United States Patent [19]
Kotani et al.

[11] Patent Number: 5,805,800
[45] Date of Patent: Sep. 8, 1998

[54] APPARATUS AND METHOD FOR CONTROLLING STORAGE MEDIUM USING SECURITY CAPABILITIES

[75] Inventors: Seigo Kotani; Keiichi Murakami; Shinichi Yoshimoto; Kouichi Kanamoto; Tatsuro Masuda; Makoto Yoshioka; Masao Fujiwara, all of Kawasaki, Japan

[73] Assignee: Fujitsu Limited, Kawasaki, Japan

[21] Appl. No.: 734,261

[22] Filed: Oct. 21, 1996

[30] Foreign Application Priority Data

Nov. 7, 1995 [JP] Japan .................................. 7-288931
Nov. 7, 1995 [JP] Japan .................................. 7-288932

[51] Int. Cl.$^6$ .................................................. G06F 11/60
[52] U.S. Cl. ...................... 395/186; 395/188.01; 711/164
[58] Field of Search .............................. 395/186, 188.01, 395/187.01, 490; 380/3, 4, 23, 25; 340/825.3, 825.31, 825.34; 711/163, 164

[56] References Cited

U.S. PATENT DOCUMENTS

| | | | |
|---|---|---|---|
| 4,947,318 | 8/1990 | Mineo | 364/236.2 |
| 5,058,162 | 10/1991 | Santon et al. | 380/25 |
| 5,371,792 | 12/1994 | Asai et al. | 380/3 |
| 5,375,243 | 12/1994 | Parzych et al. | 395/188.01 |
| 5,379,433 | 1/1995 | Yamagishi | 380/4 |
| 5,418,852 | 5/1995 | Itami et al. | 380/4 |
| 5,542,023 | 7/1996 | Sakai et al. | 395/154 |
| 5,599,231 | 2/1997 | Hibino et al. | 463/29 |
| 5,636,277 | 6/1997 | Nagahama | 380/4 |
| 5,651,139 | 7/1997 | Cripe et al. | 395/490 |
| 5,668,945 | 9/1997 | Ohba et al. | 395/186 |

*Primary Examiner*—Joseph Palys
*Attorney, Agent, or Firm*—Staas & Halsey

[57] ABSTRACT

The CPU in the processing unit of an external storage device transmits data between an information processing device and a storage medium, determines whether or not the information processing device can access the storage medium of the external storage device, decrypts data encrypted in the storage medium, etc. using a program loaded into RAM through an interface or a read/write unit. Changing the data loaded into the RAM efficiently and flexibly guarantees the security of the data stored on the storage medium.

10 Claims, 11 Drawing Sheets

APPARATUS AND METHOD FOR CONTROLLING STORAGE MEDIUM USING SECURITY CAPABILITIES

BACKGROUND OF THE INVENTION

1. Field of the Invention

The present invention relates to a removable storage medium, and more specifically to a storage media control apparatus for protecting the stored data and to a storage medium control method for guaranteeing the protection.

2. Description of the Related Art

In information processing technologies, there are several types of storage media for storing data. Conventional removable storage media are magnetic tapes, magnetic disks, magneto-optical disks, optical disks, etc., and new storage media are being introduced one after another.

Recently, with these portable large-capacity storage media, a large volume of data can be stored and distributed, and guaranteeing security for the stored data and copyright is of increasing concern.

The protection of data, copyright, etc. can be attained by completely controlling access to the data. However, a system for completely controlling access to data is costly. Furthermore, it is practically impossible to completely protect removable storage media from accidental loss, theft, etc.

There are the following problems with the security of data stored on the conventional portable storage media.

It is impossible to completely prevent a removable storage medium from being obtained by malicious people through careless loss or illegal means, etc. If a malicious person has obtained a storage medium through any route and the person is able to access the data stored on the medium, then security cannot be guaranteed for the data or copyright. Under such circumstances, it is earnestly desired that illegal access to the data on storage media is prevented.

SUMMARY OF THE INVENTION

The present invention aims at providing an apparatus and a method of controlling a storage medium with illegal access to the data of the removable storage medium successfully prevented, at a reasonable cost.

The storage media control apparatus according to the present invention comprises a processing unit and a loading unit, and utilizes a removable storage medium with an external storage device, for processing the data stored on the storage medium.

The processing unit has a rewritable storage area, and performs a process of transmitting data between a storage medium and an information processing device according to the information stored in the storage area, for example, a process of protecting the data stored on the storage medium.

The loading unit loads the information from the storage medium or the information processing device, to the storage area in the processing unit.

Thus, providing a rewritable storage area in the processing unit allows the loading unit to load a program stored in the storage area paired with the data as the information to be loaded into the storage area, and allows the processing unit to access data according to the program. As a result, a different access algorithm and encrypting/decrypting algorithm can be individually adopted for each piece of data or each storage medium. Adopting an algorithm for determining the possibility of access to the data on each storage medium allows the contents of the storage media to be flexibly protected.

As an example of an algorithm for determining the possibility of access, it is determined whether or not access is permitted to an information processing device and a storage medium by comparing a license code stored on the storage medium with a determination code comprising information which uniquely identifies each medium and is stored in an area of the medium inaccessible from outside the external storage device, for example, an information processing device, and the information uniquely identifying an external storage device.

In this method, access is permitted to the stored contents as a pair comprising a permitted storage medium and an external storage device only. Therefore, when a different pair is mistakenly or intentionally formed, access is rejected. As a result the security of data and copyright is guaranteed. If a plurality of permission signals are stored on a storage media, the storage media can be accessed by a plurality of external storage devices.

If the license code in the storage medium is changed by the user of the storage medium and a program for generating the determination signal is loaded from the information processing device to the storage area, then it is possible to make a generated algorithm unknown to any person, including the provider of the medium, other than the user.

As described above, the process information can be loaded by providing a rewritable area in the processing unit according to the present invention, and the security of data in the mounted storage medium can be flexibly guaranteed. As a result, illegal access to a storage medium can be rejected using a simple configuration, thereby efficiently guaranteeing the security of the data in the medium and the copyright relating to the data.

DESCRIPTION OF THE PREFERRED EMBODIMENT

Figure 1:
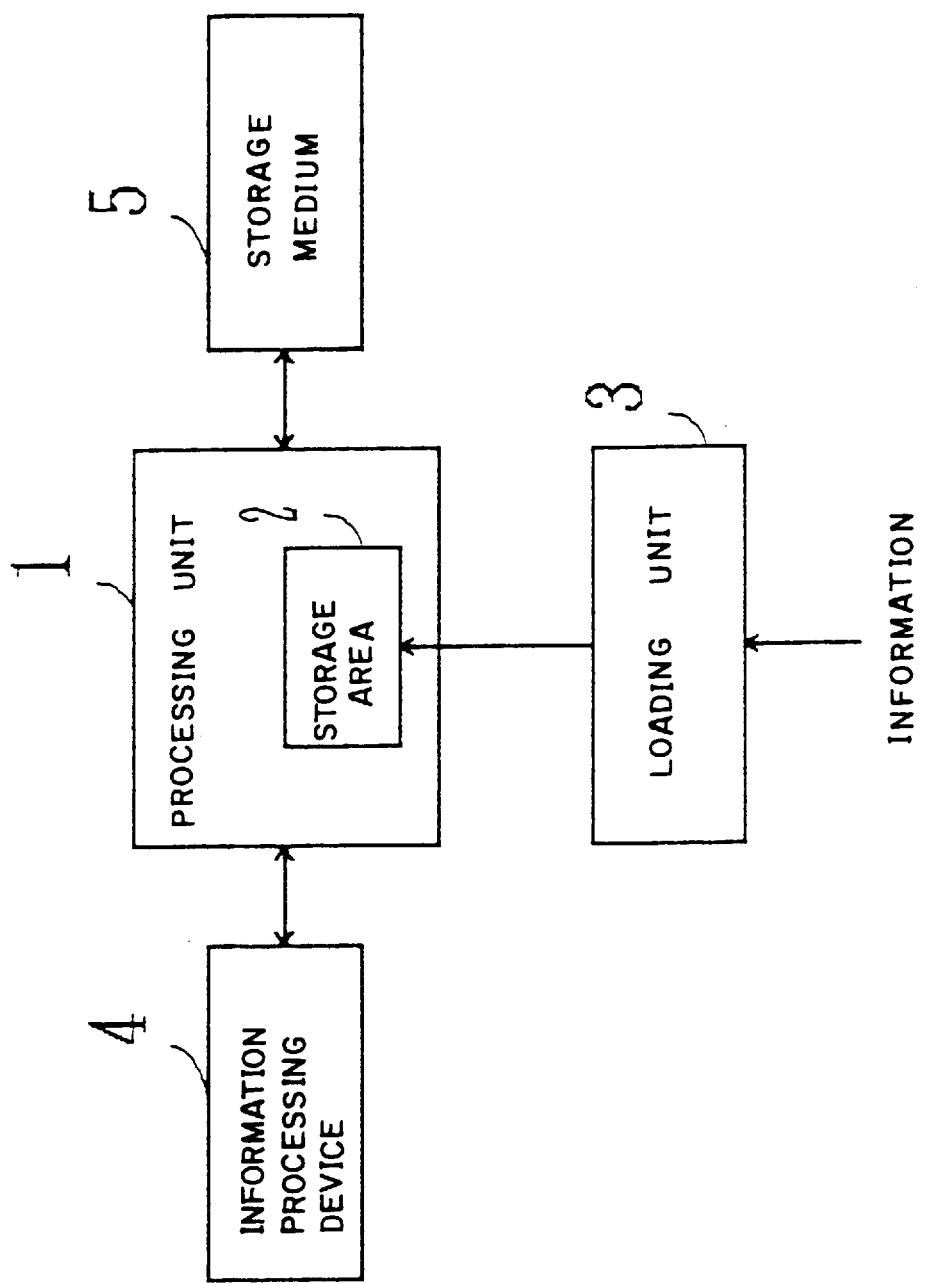
FIG. 1 shows the principle of the present invention.

FIG. 1 shows the principle of the medium control device according to the present invention. The medium control device shown in FIG. 1 comprises a processing unit 1 and a loading unit 3, and is provided in an external storage device.

The processing unit 1 comprises a rewritable storage area 2, and performs a process of transmitting data between an information processing device 4 and a storage medium 5 according to the information stored in the storage area 2. The loading unit 3 loads the above described information into the storage area 2 of the processing unit 1.

Thus, the process program performed by the processing unit 1 becomes loadable by providing the medium control device with the rewritable storage area 2 and loading unit 3, and the data stored on the storage medium 5 can be flexibly protected.

For example, the loading unit 3 loads a program stored on the storage medium 5 as a pair with the corresponding data, and the processing unit 1 performs a process of accessing the data using the program. As a result, a unique access algorithm and encrypting algorithm can be individually adopted for each data or medium.

The processing unit 1 stores the access determining algorithm in the storage area 2, according to which the processing unit 1 determines whether or not an external storage device can access the storage medium 5.

As an example of the determining algorithm, a pair of the storage medium 5 and an external storage device allowed to access the data stored on the storage medium 5 is permitted in one step, and any other combinations are prohibited from accessing the medium.

In this method, only a permitted combination of a storage medium and an external storage device is allowed to access the data stored on the storage medium. Therefore, another combination mistakenly or intentionally specified can be rejected from accessing the medium, thereby guaranteeing the security of the stored data and related copyright.

Figure 2:
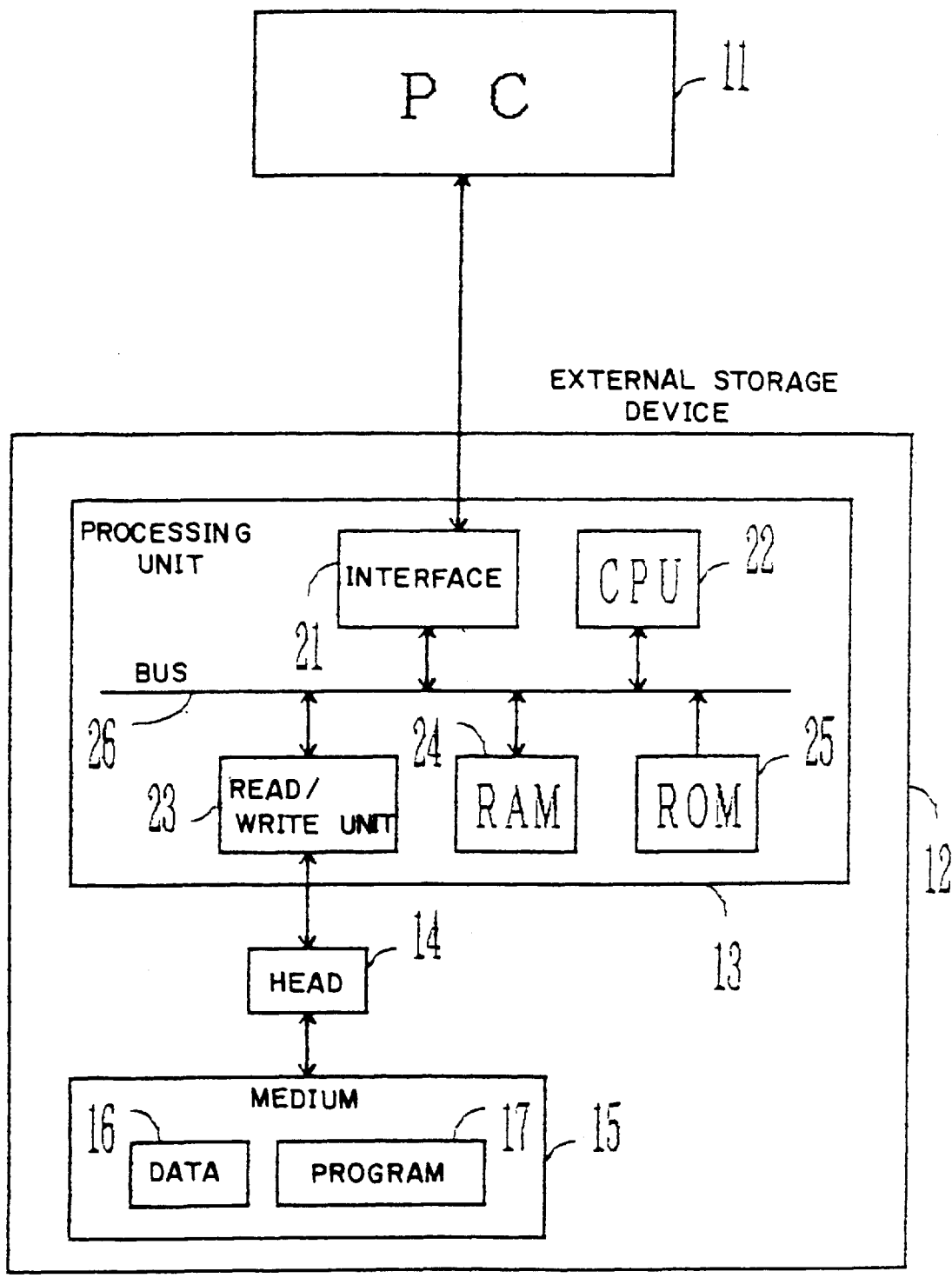
FIG. 2 shows the configuration of an embodiment.

For example, the processing unit 1 shown in FIG. 1 corresponds to a processing unit 13 shown in FIG. 2. The storage area 2 corresponds to a RAM (random access memory) 24. The loading unit 3 corresponds to an interface 21 or a read/write unit 23. The information processing device 4 corresponds to, for example, a PC (personal computer) 11.

The embodiment of the present invention is described in detail by referring to the attached drawings.

FIG. 2 shows the configuration of the information processing system according to an embodiment of the present invention. The information processing system shown in FIG. 2 comprises the PC 11 and an external storage device 12.

The external storage device 12 comprises a head 14 for accessing a medium 15, and the processing unit 13 for performing a driving process to control the medium 15, and accessing the data stored on the medium 15 according to the instruction from the PC 11. The medium 15 stores, for example, data 16 and a program 17. The program 17 contains an algorithm required to access the data 16. When the data 16 is encrypted, the program 17 further contains the decrypting algorithm.

The processing unit 13 comprises the interface 21, a CPU 22 (central processing unit), the read/write unit 23, the RAM 24, a ROM (read-only memory) 25, and a bus 26 for connecting all of the above listed units. The processing unit 13 accesses the medium 15 while communicating with the PC 11.

The interface 21 transmits and receives information to and from the PC 11. The read/write unit 23 controls the head 14 to read data stored on the medium 15 and write data to the medium 15. The CPU 22 performs a driving process according to the information stored in the RAM 24 or ROM 25. For example, the CPU 22 can be a microprocessor, and the processing unit 13 is designed as a microcomputer.

The ROM 25 preliminarily stores a driving program to be executed when the power is applied to the external storage device 12. The RAM 24 stores a program for determining whether or not the external storage device 12 can access the medium 15. The CPU 22 determines access according to the algorithm. When the program in the RAM 24 contains the decrypting algorithm for the data 16, the CPU 22 decrypts the data 16 according to the decrypting algorithm.

The program in the RAM 24 can be rewritten according to the information loaded through the interface 21 and read/write unit 23. The algorithm is loadable. The method of loading a program to the processing unit 13 can be, for example, loading the program from a medium 15 and PC 11 and storing it in the RAM 24. One of other applicable methods is to write a program in the ROM 25 and exchange the entire ROM 25 containing the program in case of the necessity of changing the program.

Figure 3:
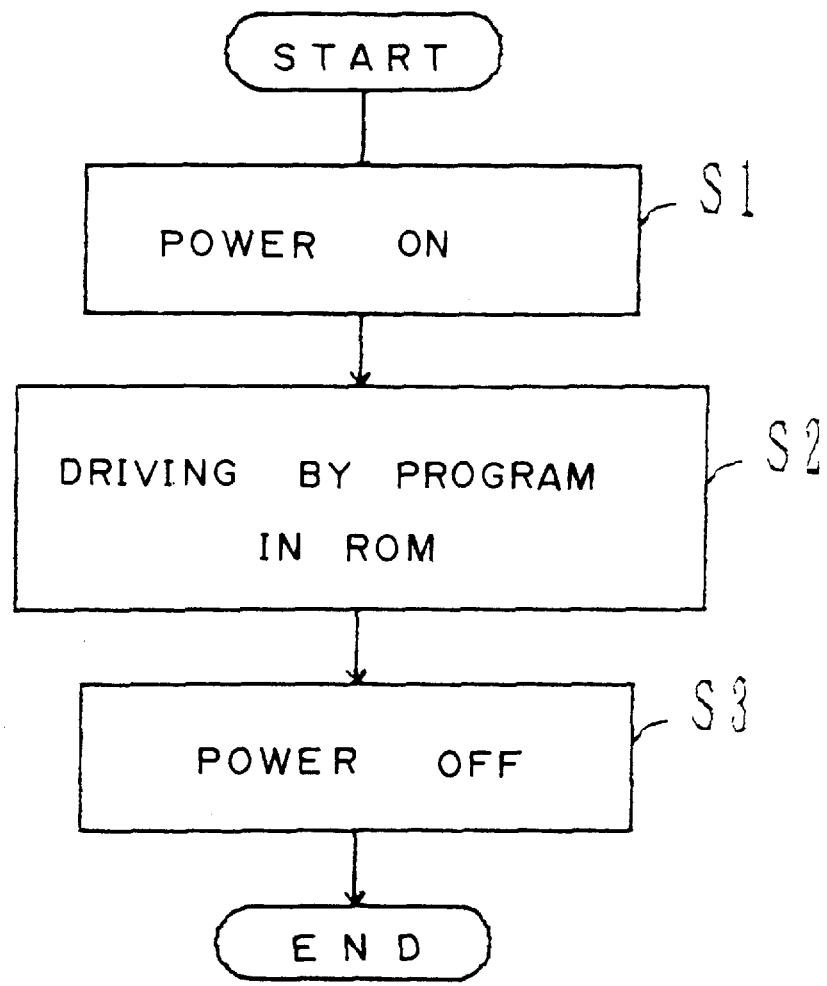
FIG. 3 is a flowchart showing the operations of the processing unit.
Figure 4:
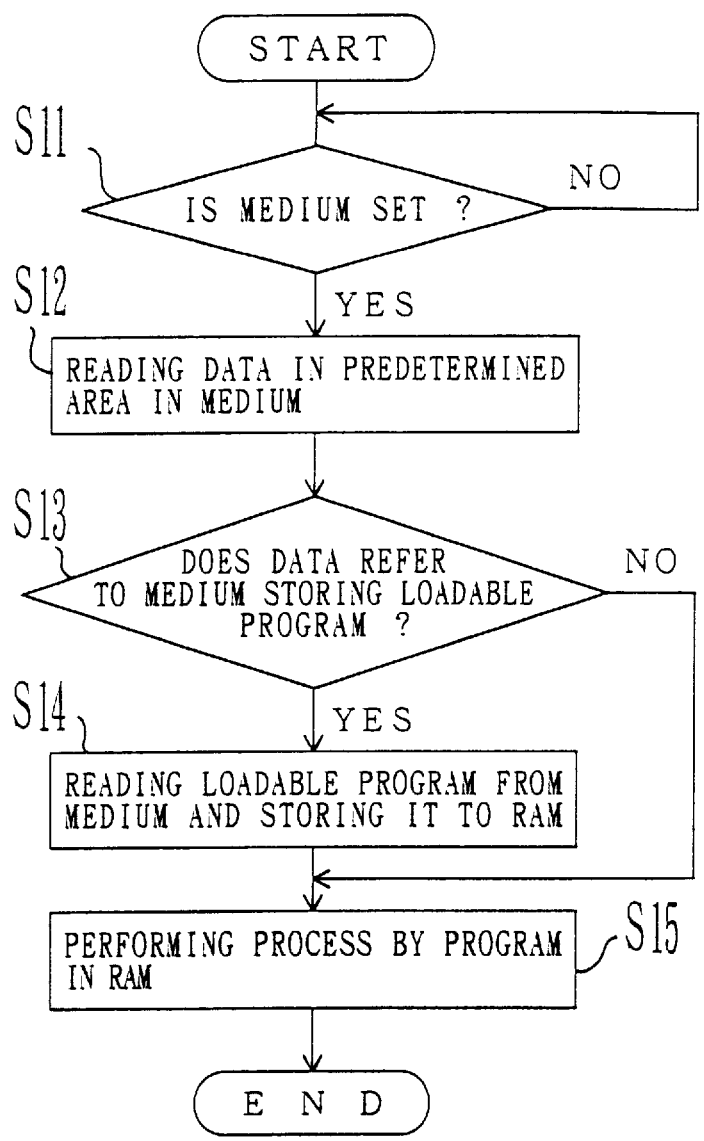
FIG. 4 is a flowchart showing a medium determining process.
Figure 5:
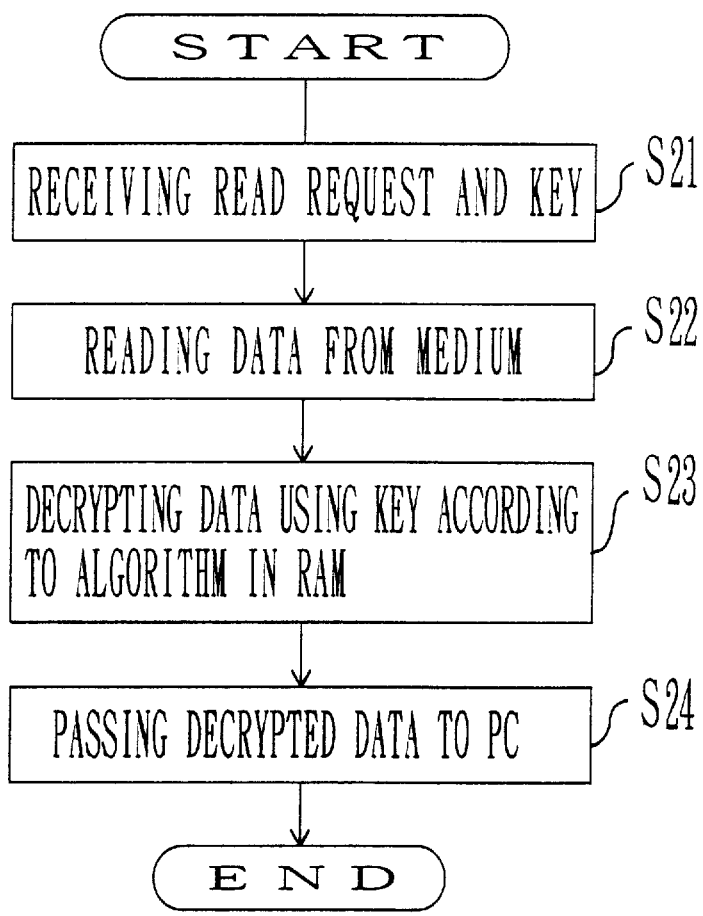
FIG. 5 is a flowchart showing a decoding process.

Next, the driving process in which the data 16, if encrypted, is read and decrypted, is described by referring to FIGS. 3 through 5.

FIG. 3 is a flowchart showing the operations of the processing unit 13. When the power is applied to the external storage device 12 in FIG. 3 (step S1), the CPU 22 performs a driving process through the program in the ROM 25 (step S2). When the power is turned off (step S3), the process terminates.

FIG. 4 is a flowchart showing one of the medium determining process performed as a sub-process of the driving process in step S2 shown in FIG. 3. When the process starts as shown in FIG. 4, the processing unit 13 determines whether or not the medium 15 has been set in the external storage device 12 according to information from the head 14 (step S11). Unless the medium 15 has been set, the determination is repeatedly made. If the medium 15 has been set, then the data in a specified area is read (step S12).

Then, it is determined whether or not the data indicates that a loadable program is loaded on the medium 15 (step S13). If the read data indicates a loadable program loaded on the medium 15, then the program 17 is read from the medium 15 and stored in the RAM 24 (step S14), a decrypting process is performed according to the program 17 (step S15), and the process terminates.

If it is determined that a loadable program has not been loaded on the medium 15, then a decrypting process is performed according to the program preliminarily stored in the RAM 24 (step S15), and the process terminates.

FIG. 5 is a flowchart showing one of the decrypting processes performed on the data 16 in step S15 shown in FIG. 4. When the process starts as shown in FIG. 5, the processing unit 13 first receives a decryption key together with a request to read the data 17 from the PC 11 (step S21).

Then, the encrypted data 16 in the medium 15 is read (step S22) and is decrypted using the key from the PC 11 according to the algorithm of the program 17 in the RAM 24 (step S23). At this time, the data 16 is transformed by, for example, substituting a key for a variable in the transform equation defined in the program 17. The decrypted data is transmitted to the PC 11 (step S24), and the decrypting process terminates.

Thus, a specific decrypting algorithm can be individually applied for each piece of data or a medium by performing the decrypting process through the program 17 stored as a pair with the data 16.

The access determining process performed by the processing unit 13 on the medium 15 is described by referring to FIGS. 6 through 11.

Figure 6:
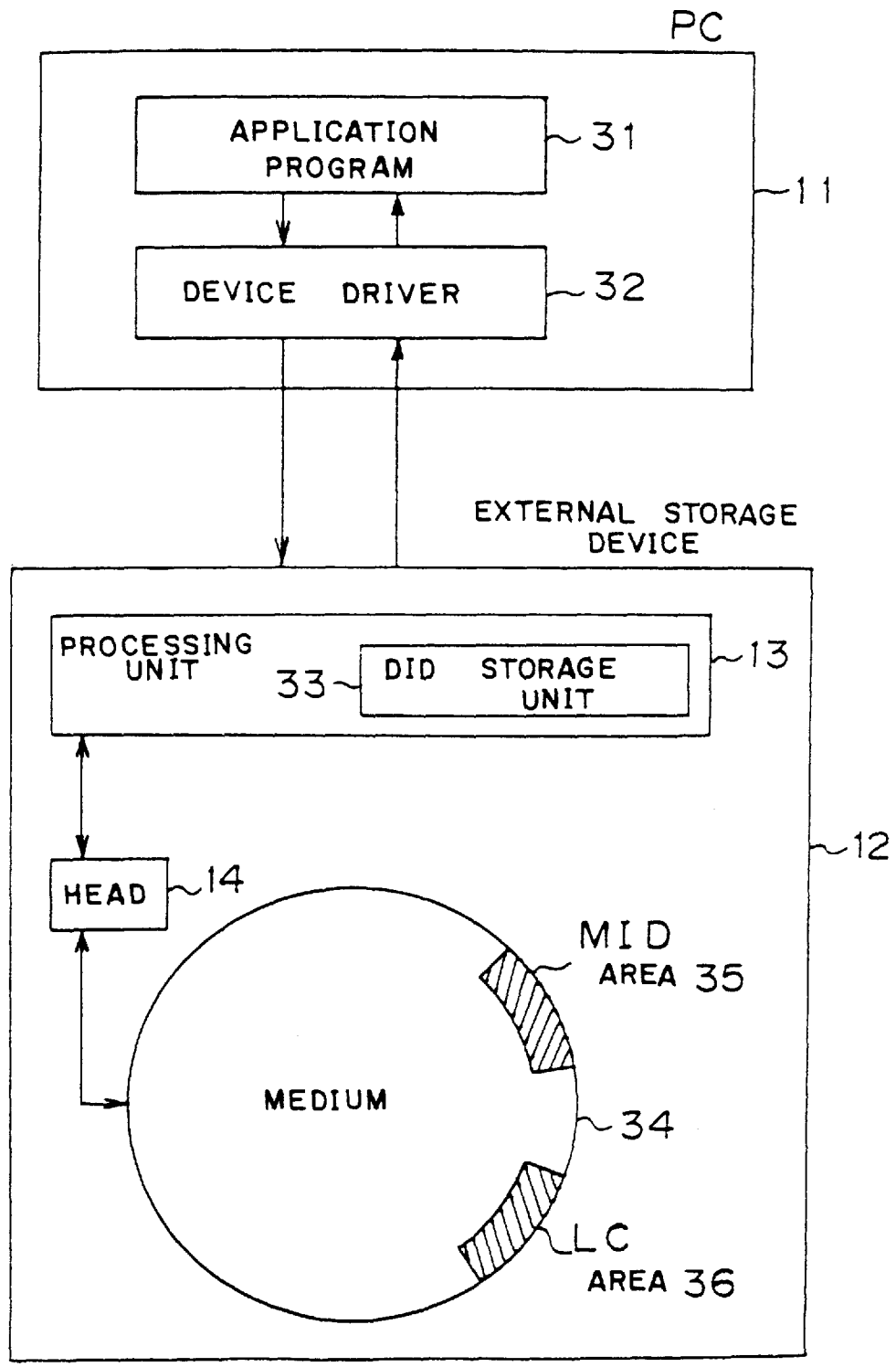
FIG. 6 shows the configuration of the system for determining access.

FIG. 6 shows the configuration of the information processing system when access is determined. In FIG. 6, items also shown in FIG. 2 are assigned the same identification number. The PC 11 comprises a user application program 31 and a device driver 32 which is a software tool for access to the external storage device 12. The processing unit 13 of the external storage device 12 comprises a DID storage unit 33 for storing a drive identifier (DID).

The DID is a unit identifier which uniquely specifies the drive of the external storage device 12. For example, the production serial number of the external storage device 12 or the like is used. It is desired that the DID is not rewritable. The DID storage unit 33 is provided in, for example, the ROM 25.

A medium 34 comprises an MID area 35 for storing a medium identifier (MID) and an LC area 36 for storing a license code (LC).

An MID is an identifier for uniquely identifying the medium 34. It is desired that the MID is written on a medium in a non-rewritable format except for a special case such as manufacture, etc. Therefore, the MID area 35 is provided in a non-rewritable portion of the medium 34 by a normal process. Or, for example, the MID can be written by a method requiring a high cost in rewriting data by, for example, complicating the structure of a code using a number of logical parity checks, etc.

The LC area 36 is provided in a rewritable portion in the medium 34, and is used by the processing unit 13 when it determines whether or not the medium 34 can be accessed. The processing unit 13 can rewrite the LC as necessary during the access determination. However, the application program 31 and device driver 32 in the PC 11 cannot access the LC area 36.

According to the determination algorithm used in the following embodiments, a combination of the medium 34 and the external storage device 12 which is allowed to access the data stored on the medium 34 is designated in a process step. No other combinations are permitted to access the medium. As a result, the processing unit 13 generates a judge code (JC) uniquely generated according to the MID on the medium 34 and the DID in the external storage device 12. The access determination is made using the LC and JC.

Figure 7:
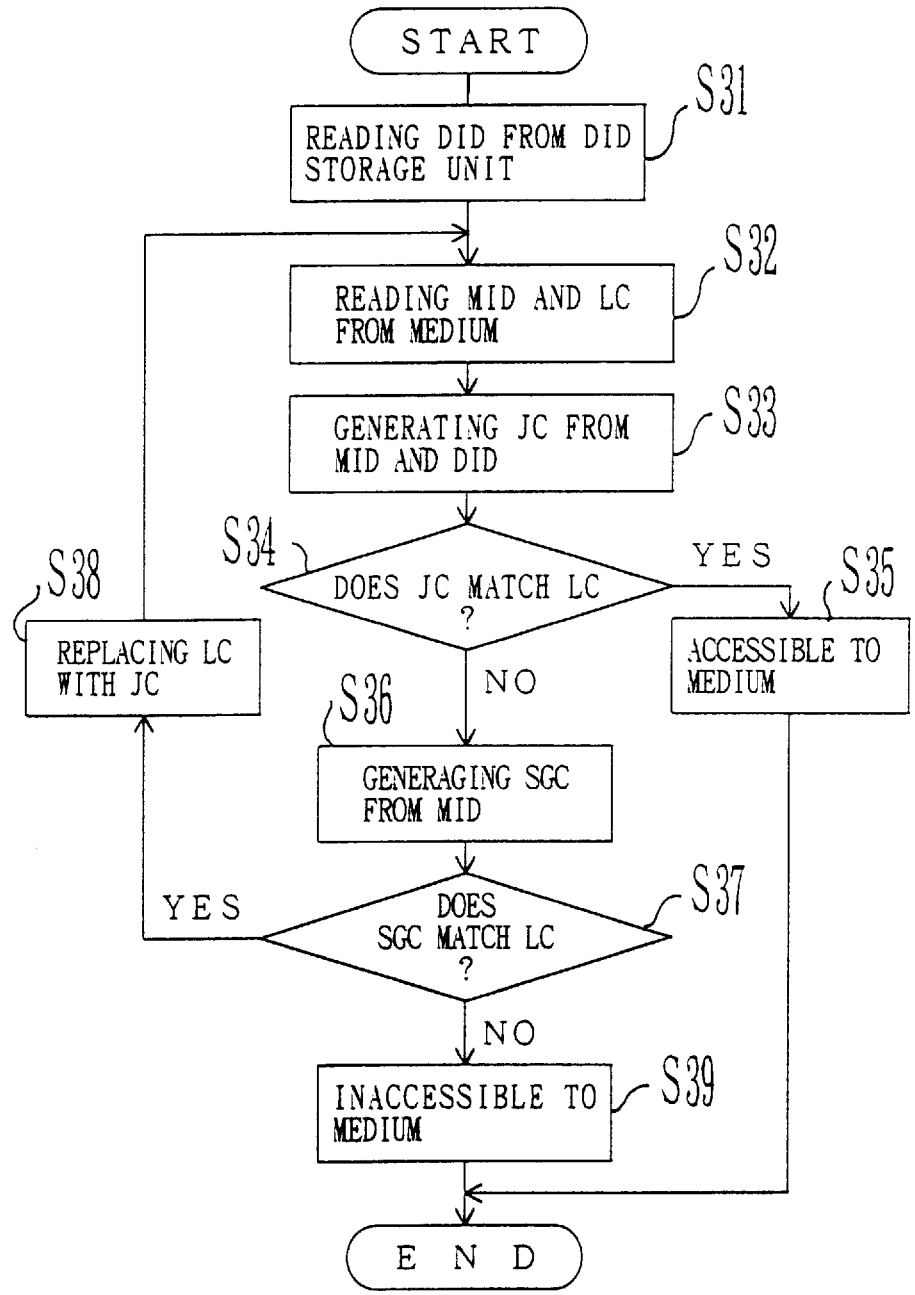
FIG. 7 is a flowchart showing the first access determining process.

FIG. 7 is a flowchart showing the first access determining process performed by processing unit 13. When the process starts as shown in FIG. 7, the processing unit 13 first reads the DID from the DID storage unit 33 (step S31), and reads the MID and LC from the medium 34 (step S32). Then, according to a first code generating algorithm, a JC is generated from the MID and DID (step S33), and it is compared with the LC (step S34). If the generated JC matches the LC of the medium 34, it is determined that the external storage device 12 is allowed to access the medium 34 (step S35), and the determining process terminates.

Hereinafter, the medium 34 can be accessed on request from the PC 11.

In step S34, if the JC does not match the LC, then a supplier guarantee code (SGC) is generated from the MID according to a second code generating algorithm (step S36) and is compared with the LC (step S37).

The SGC is generated according to the same algorithm as the above described second code generating algorithm, by the supplier at the time of shipment of the medium 34, and written to the LC area 36 of the medium 34 as an initial value for the LC. The processing unit 13 generates the SGC and compares it with the LC of the medium 34. Then, it checks whether or not the LC of the medium 34 still indicates the value at the time of shipment.

If the generated SGC matches the LC, it proves that the medium 34 is still new, and the LC of the medium 34 is replaced with the JC (step S38), and the processes in and after step S32 are repeated. In this case, the LC in the LC area 36 equals the JC. Therefore, the LC matches the JC in step S34, indicating that access is allowed (step S35).

If the SGC does not match the LC, it is determined that the external storage device 12 is not allowed to access the medium 34 (step S39), and the process terminates. In this case, the LC area 36 contains codes other than the SGC or JC, that is, a JC generated according to another code generating algorithm or using the DID of another unit, so that the external storage device 12 is prohibited from accessing the medium 34.

Thus, the JC is generated using both the MID and DID, and written to the LC area 36 to prohibit a unit having an unauthorized DID from accessing the medium 34. That is, the external storage device 12 accessible to the medium 34 is entered in the LC area 36.

In step S33, JC can be generated using the MID. In this case, if a JC is generated according to a generating algorithm different from the algorithms of other systems, the above described effect can also be obtained.

In the above described embodiment, the medium 34 is not accessible by a unit other than the external storage device 12. However, using a medium on which a plurality of LCs can be written, the medium can be accessible by a plurality of units.

Figure 8:
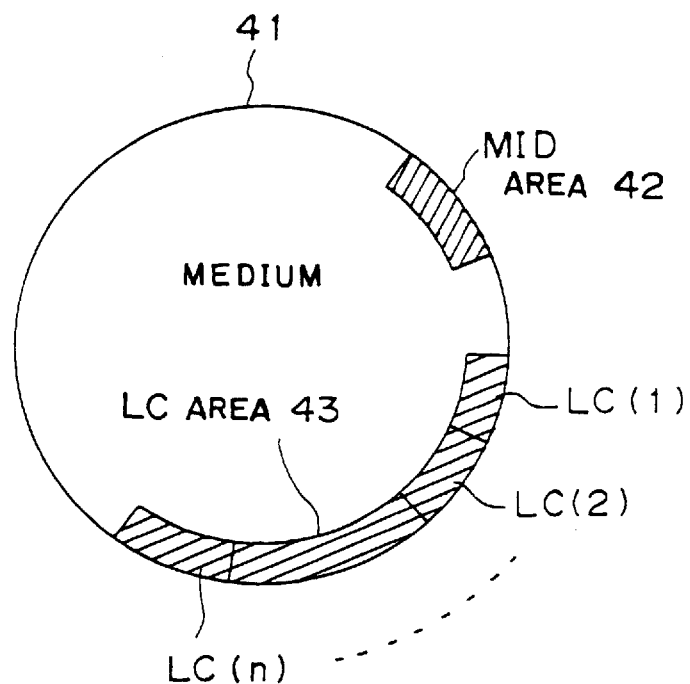
FIG. 8 shows a medium having a plurality of LCs.

FIG. 8 shows a medium having a plurality of LCs. A medium 41 shown in FIG. 8 comprises a MID area 42 storing a MID, and an LC area 43 storing LC(1), LC(2), . . . , LC(n) corresponding to n LCs (n is an integer equal to or larger than 1). An SGC is preliminarily written to the LC(i) (i=1, 2, . . . , n). However, rewriting each SGC into the JC allows up to n units having different DID to be entered.

Figure 9:
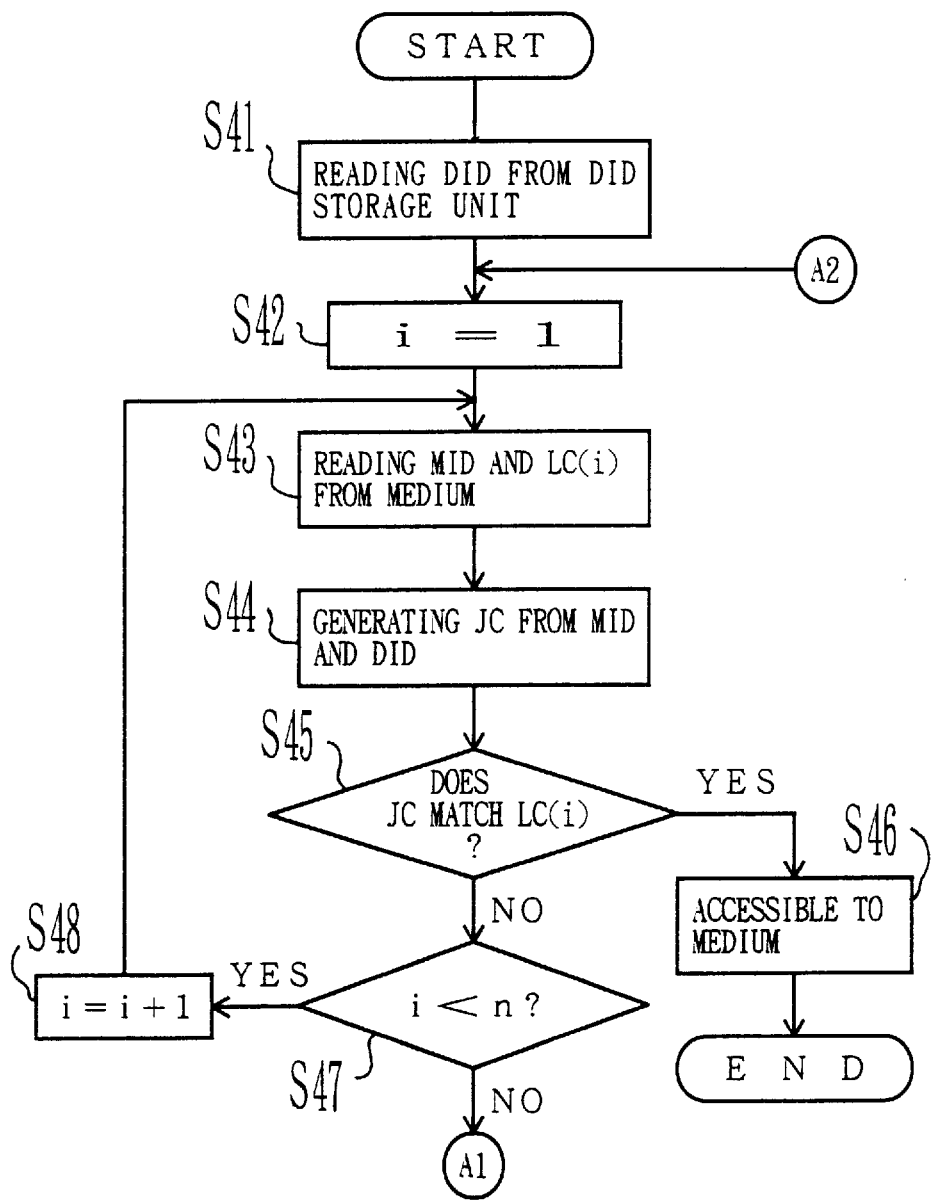
FIG. 9 is a flowchart (1) showing the second access determining process.
Figure 10:
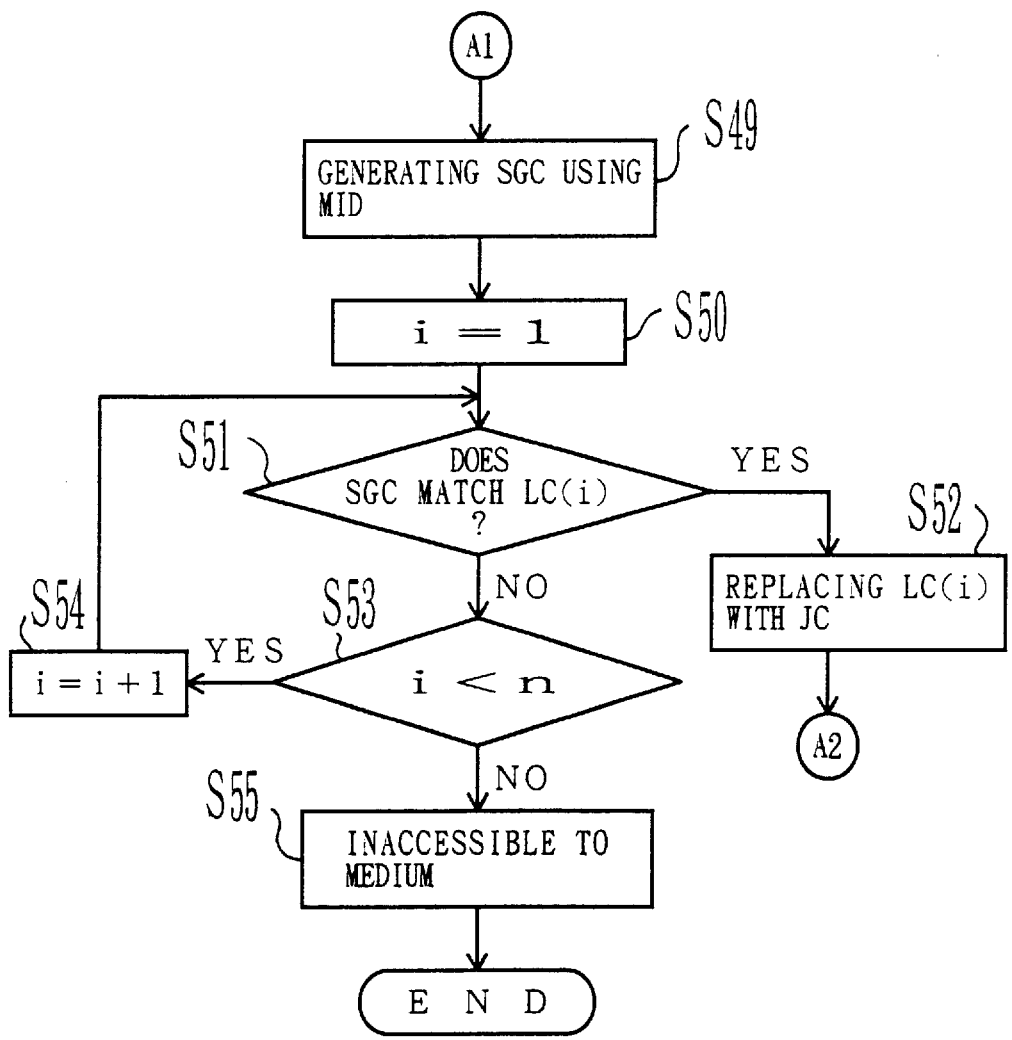
FIG. 10 is a flowchart (2) showing the second access determining process.

FIGS. 9 and 10 are flowcharts showing the second access determining process in which the possibility of the access to the medium 41 is determined. When the process starts as shown in FIG. 9, the processing unit 13 first reads the DID from the DID storage unit 33 (step S41) and sets the control variable i to 1 (step S42).

Then, the MID and LC (i) are read from the medium 41 (step S43), a JC is generated from the MID and DID according to the first code generating algorithm (step S44), and the JC is compared with the LC (i) (step S45). If the generated JC matches the LC (i) of the medium 41, then it is determined that the external storage device 12 is allowed to access the medium 41 (step S46), and the determining process terminates.

When the JC does not match the LC(i) in step S45, i is compared with n (step S47). If i is smaller than n, then i=i+1 is set (step S48) and the processes in and after step S43 are repeated.

If i has reached n in step S47, it indicates that the JC has not matched any LC (i). Then, an SGC is generated from the MID according to the second code generating algorithm (step S49 in FIG. 10) and i is again set to 1 (step S50).

Next, the generated SGC is compared with the LC (i) (step S51). If the SGC matches the LC, then the LC (i) on the medium 41 is replaced with the JC (step S52) and the processes in and after step S42 in FIG. 9 are repeated. If the SGC does not match the LC (i) in step S51, i is compared with n (step S53). If i is smaller than n, then i=i+1 is set (step S54), and the processes in and after step S51 are repeated.

If i has reached n in step S53, it indicates that no SGC is stored in any LC (i) and the entry of a new unit is not allowed. Then, it is determined that the external storage device 12 is not allowed to access the medium 41 (step S55) and the determining process terminates.

In such a second access determining process, up to n external storage devices are allowed to access a specified medium.

In the first and second access determining processes, the SGC generated by a supplier is described as an example of an initial LC generated using an MID. In addition to this, a special code (SPC) uniquely generated by an owner of a medium can be used.

In this case, the owner of the medium preliminarily rewrites the SGC in the LC area into a unique SPC, and loads from the PC 11 into the RAM 24 the generating algorithm as the second code generating algorithm. Then, the processing unit 13 generates an SPC according to the algorithm used in step S36 shown in FIG. 7 and in step S49 shown in FIG. 10, and compares the SPC with the LC and LC (i) in steps S37 and S45.

Thus, using the SPC instead of the SGC, the generating algorithm is not known to anybody, including the supplier of the medium, other than the owner. Even if the unit has not been entered yet, any unit other than the owner's unit cannot access the medium. Particularly, in an organization in which a medium and a unit are systematically integrated and operated, for example, a bank, writing an SPC is effective. In this case, the SPC is determined and used under the control of the organization.

The access determining algorithm is stored in the RAM 24 as described above, and all or a part of the algorithm can be altered as necessary. For example, when the first code generating algorithm for generating a JC is altered in the RAM 24 in the first access determining process, the medium 34 is not accessible afterwards. Thus, a process of detecting an alteration in an algorithm is required.

Figure 11:
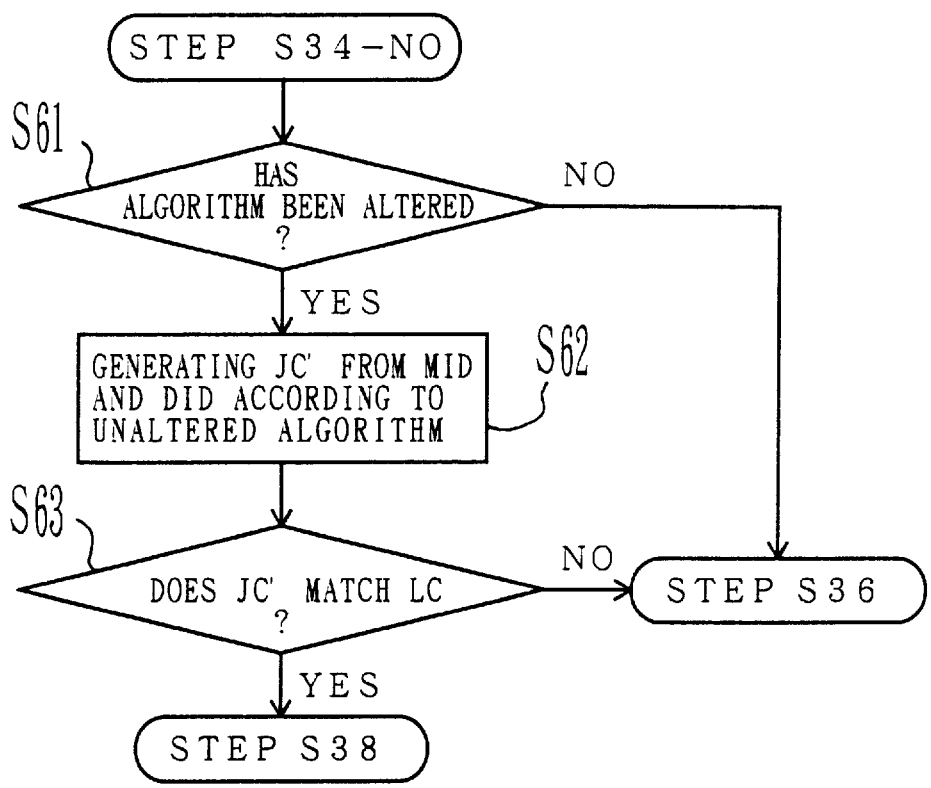
FIG. 11 is a flowchart showing the third access determining process.

FIG. 11 is a flowchart showing the third access determining process responsive to an alteration in the first code generating algorithm. The entire flow of the third access determining process is obtained by inserting the three steps shown in FIG. 11 in the flow of the first access determining process shown in FIG. 7.

When the JC does not match the LC in step S34 shown in FIG. 7, the processing unit 13 checks whether or not the first code generating algorithm has been altered (step S61). Unless the first code generating algorithm has been altered, control is passed to the processes in and after step S36, and it is checked whether or not the medium 34 is still new.

If it has been altered, a JC' is generated from the MID and DID according to the unaltered code generating algorithm (step S62), and is compared with the LC (step S63). The unaltered code generating algorithm is stored in the RAM 24 as an original algorithm before alteration.

Unless the generated JC' matches the LC, control is passed to the processes in and after step S36 to check whether or not the medium 34 is still new. If they match each other, then it indicates that the external storage device 12 has been entered on the medium 34 and control is passed to the process in step S38, and the LC is replaced with the JC generated by the altered algorithm. Thus, the external storage device 12 is re-entered according to the new algorithm.

According to the above described embodiment, the processing unit of the external storage device performs a security process on the data stored on the medium that is the decrypting process, the access determining process, etc., using the program stored in the RAM. Another security process can be a medium data encrypting process, a code converting process, a data modifying process, etc. Furthermore, the processing unit performs a more general process on the data transmitted between a medium and a PC.

According to the present invention, a rewritable area provided in the processing unit of an external storage device allows the process program to be loaded and the security of the data on the removable medium to be flexibly guaranteed. For example, a program stored on the medium as a pair of data can be loaded to perform a process of accessing the data. Thus, a specific encrypting algorithm can be individually applied to each piece of data or each medium.

Furthermore, the data stored on a medium is accessible by a licensed combination of a storage medium and a storage device, thereby preventing other mistakenly or intentionally specified combinations from accessing the data.

Therefore, the security of the data stored on the medium and the related copyright can be efficiently guaranteed.

What is claimed is:

1. An apparatus which controls a removable storage medium for use in combination with the storage medium and operates as external storage device for processing data stored on the storage medium, comprising:

reading means for reading a medium identifier and a license code stored on the storage medium; and processing means for generating a judge code using the medium identifier, comparing the judge code with the license code, and determining whether or not the external storage device is allowed to access the storage medium, wherein said processing means determines access by generating a predetermined code using the medium identifier and comparing the predetermined code with the license code when the judge code does not match the license code, and by replacing the license code in the storage medium with the judge code and comparing the replaced license code with the judge code when the predetermined code matches the license code.

2. The apparatus according to claim 1, wherein said processing means generates as the predetermined code a supplier guarantee code set by a supplier of the storage medium as the license code on the storage medium.

3. The apparatus according to claim 1, wherein said processing means generates as the predetermined code a special code set by a user of the storage medium as the license code on the storage medium.

4. The apparatus according to claim 1, wherein said processing means determines inaccessibility when the predetermined code does not match the license code.

5. The apparatus according to claim 1, wherein said processing means determines access by sequentially comparing a plurality of license codes stored on the storage medium with the predetermined code, replacing a license code matching the predetermined code with the judge code, and comparing the license code with the judge code.

6. An apparatus which controls a removable storage medium for use in combination with an information processing device and the storage medium and is operated by an external storage device for processing data stored on the storage medium, comprising:

processing means, having a rewritable storage area, for transmitting data between the storage medium and the information processing device using information stored in the storage medium; and loading means for loading the information into the rewritable storage area, wherein said processing means determines using a medium identifier and unit identifier stored on the storage medium whether or not the external storage device is allowed to access the storage medium, and said processing means generates a judge code according to the medium identifier and the unit identifier, compares the judge code with a license code stored on the storage medium, and determines accessibility when the judge code matches the license code; and said processing means determines access by generating a predetermined code using the medium identifier and comparing the predetermined code with the license code when the judge code does not match the license code, and by replacing the license code in the storage medium with the judge code and comparing the replaced license code with the judge code when the predetemrined code matches the license code.

7. The apparatus according to claim 6, wherein
said processing means generates as the predetermined code a supplier guarantee code set by a supplier of the storage medium as the license code on the storage medium.

8. The apparatus according to claim 6, wherein
said processing means generates as the predetermined code a special code set by a user of the storage medium as the license code on the storage medium.

9. The apparatus according to claim 6, wherein
said processing means determines inaccessibility when the predetermined code does not match the license code.

10. The apparatus according to claim 6, wherein
said processing means determines access by sequentially comparing a plurality of license codes stored on the storage medium with the predetermined code, replacing a license code matching the predetermined code with the judge code, and comparing the license code with the judge code.

* * * * *